United States Patent [19]

Kramer et al.

[11] 4,058,047

[45] Nov. 15, 1977

[54] CLAMP NAIL

[75] Inventors: Francis J. Kramer, Edgewood; Robert G. Rothfuss, Bellevue, both of Ky.; William C. Wise, Pleasant Plain, Ohio

[73] Assignee: Senco Products, Inc., Cincinnati, Ohio

[21] Appl. No.: 576,882

[22] Filed: May 12, 1975

[51] Int. Cl.² ............................................. F16B 15/00
[52] U.S. Cl. ........................................ 85/11; 206/344
[58] Field of Search ...................... 85/11, 17; 206/346, 206/345, 344, 343; 227/120

[56] References Cited

U.S. PATENT DOCUMENTS

| | | | |
|---|---|---|---|
| 2,061,037 | 11/1936 | McChesney | 85/11 X |
| 2,170,462 | 8/1939 | Putnam | 85/11 X |
| 2,270,803 | 1/1942 | La Place | 206/343 |
| 2,371,935 | 3/1945 | Van Akkeren | 85/11 |
| 2,991,477 | 7/1961 | Hoyle et al. | 206/344 |
| 3,266,361 | 8/1966 | Gravenhorst et al. | 85/11 |
| 3,358,822 | 12/1967 | O'Connor | 85/10 R X |
| 3,618,446 | 11/1971 | Black | 85/11 |
| 3,726,397 | 4/1973 | Springer | 85/11 X |
| 3,915,054 | 10/1975 | Black | 85/11 |

Primary Examiner—Ramon S. Britts
Attorney, Agent, or Firm—Melville, Strasser, Foster & Hoffman

[57] ABSTRACT

A clamp nail for joining two wood members tightly together by driving the nail endwise into the two members across the joint. The major length of the nail is in the form of a channel having a web and parallel upstanding flanges along both sides of the web. The web has at least two holes, leaving a central column member. The channel has a tapered transition section which may commence at the leading edge of the nail in the driving direction, or it may join a shorter channel portion at the leading edge, having a wider web and parallel upstanding flanges, to the major channel portion having a narrower web. The web is preferably bowed inwardly to bring the column member more nearly to the center of the flange height. The flange edges preferably are provided with a ledge configuration, the ledges being at a fixed distance from the back of the nail, whereby a plurality of like clamp nails may be stacked in making up a stick of clamp nails capable of use in a nailing machine having a magazine to receive a stick of said nails.

6 Claims, 10 Drawing Figures

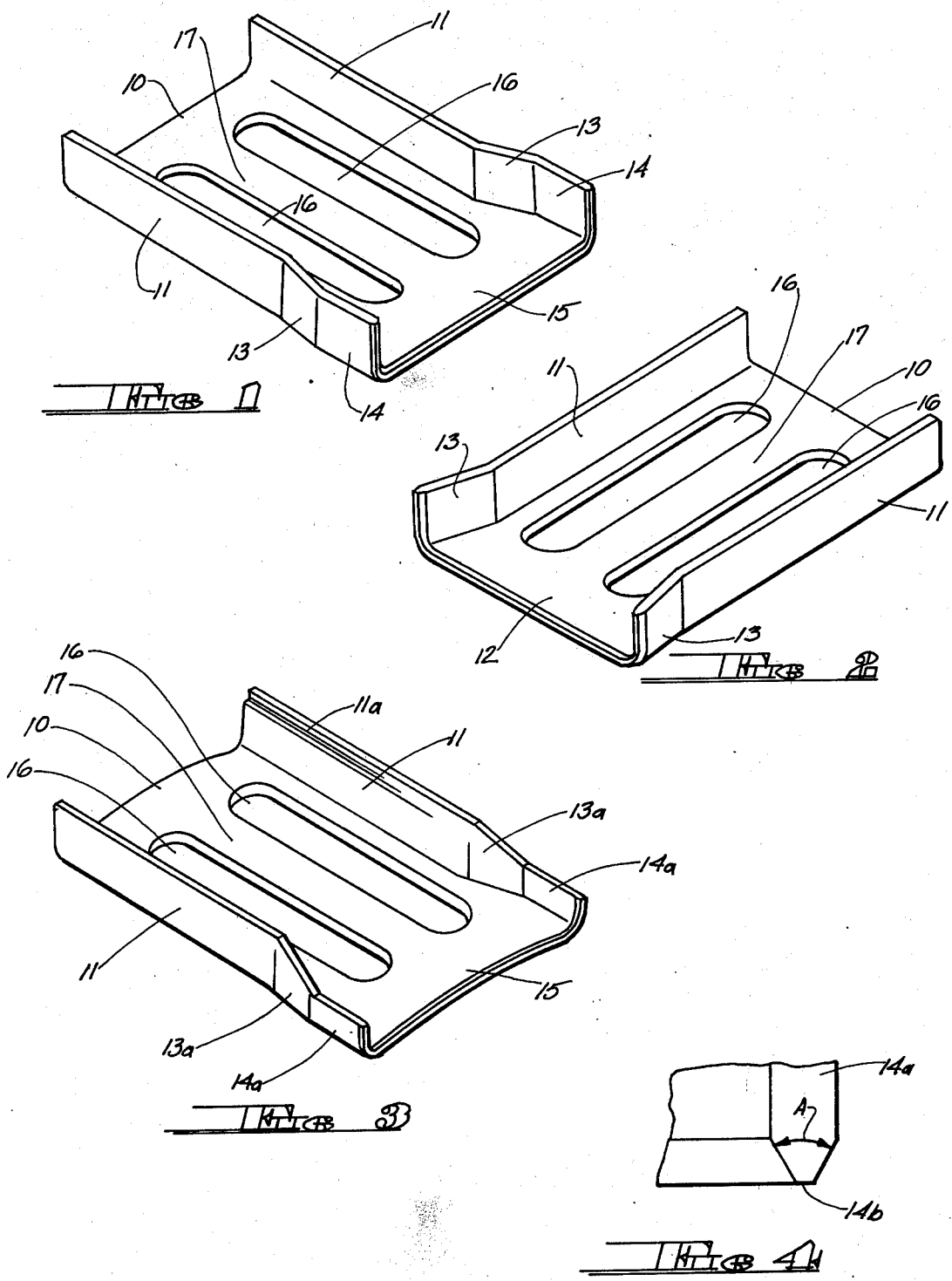

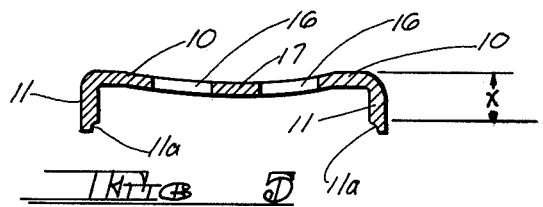
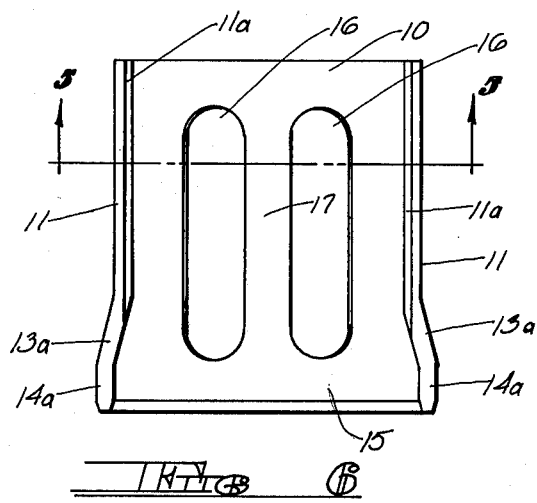
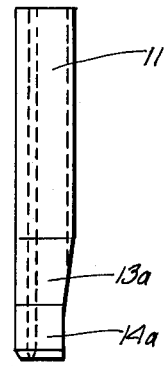
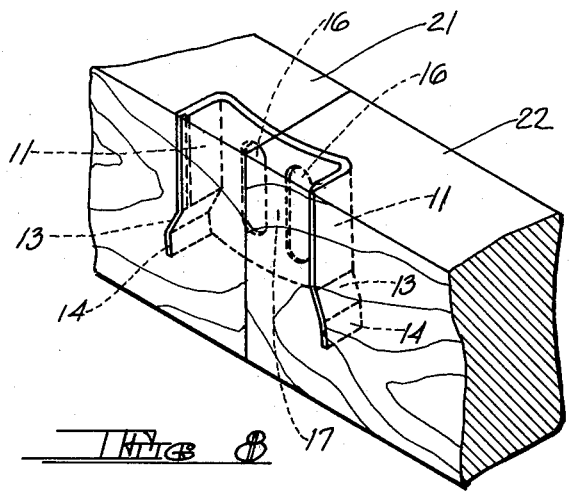
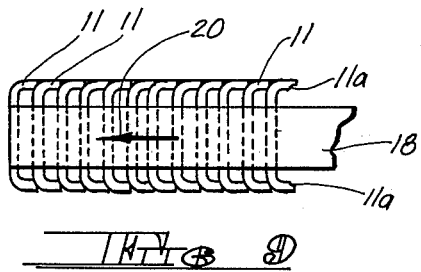
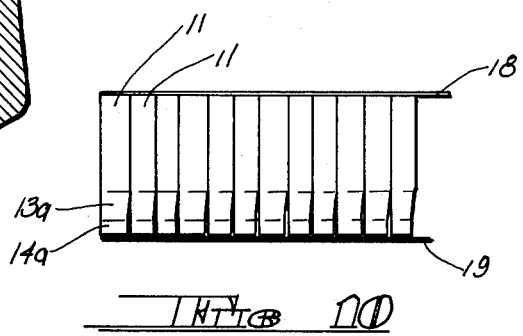

CLAMP NAIL

BRIEF SUMMARY OF THE INVENTION

When it is desired to fasten two pieces of wood together in a butt joint, whether it be a right angle joint or a miter joint and where it is desired that the two pieces be tightly clamped together, use has frequently been made of a so-called clamp nail. Such clamp nails have generally been in the form of a channel and they have been designed to be driven into the two butted pieces of wood across the joint. Thus, as the nail is driven into the wood, the flanges of the channel hold the two pieces of wood together into a tight relationship. Many such prior art clamp nails require a saw cut for proper installation.

Joints produced with a clamp nail in the form of a tapered channel have been found to be tighter at the trailing end of the fastener than at the leading end of the fastener. Such joints often appear well clamped when viewed from the direction the fastener was inserted. However, when the joint is turned over, it could be seen that the joint is not really well clamped.

It has been recognized that in order to avoid splitting of the wood into which the clamp nails are driven it is necessary to provide holes in the web to provide a space into which some of the displaced wood may move and thereby avoid a tendency to splitting. The expansion of the grain of the wood displaced during the driving of the fastener relieves a substantial amount of the stress caused in the material by the insertion of the fastener and thereby reduces the chances of failure of the joint by splitting.

According to the present invention, the area of the holes in the back of the fastener must represent at least 30% of the area of the back of the fastener in order to be effective for the purpose intended. A single hole of this magnitude in the back of the fastener would impair the structural integrity of the fastener and as a result the leading edge of the fastener would cripple during insertion and thereby produce a poor joint. According to the present invention, the minimum 30% area of holes in the back of the fastener is achieved in a way which provides for a central axial column extending all the way from the leading to the trailing end of the fastener. Thus, there must be at least two holes, or a larger number of holes totaling at least 30% but disposed in such a way as to leave the central column.

According to the present invention, the clamp nail has parallel flanges over the major portion of its length which provides substantially uniform clamping action of the wood at the joint which is being fastened. According to the present invention, a taper is provided in a transition section which is relatively short and which may commence at the leading end of the fastener in the direction of driving or the leading end may comprise a channel having upstanding parallel flanges, which flanges are spaced farther apart than the flanges in the major portion of the nail and the leading parallel flanges are connected to the major parallel flanges by the so-called transition section.

Another problem arises where clamp nails are desired to be assembled into a stick suitable for use in a nailing machine having a magazine designed to accept a stick of such clamp nails. If the clamp nails are not precisely uniform in dimensions and a plurality of such nails are stacked together, there will be a tendency for the stick to curve and not be perfectly straight. This is overcome by providing the upstanding flanges with stacking ledges which are produced during the manufacturing process by a coining operation so that the bottoms of the ledges are at a uniform distance from the back of the nail. Thereby the desired result is achieved and a stick of nails may be assembled and the stick will be perfectly straight so that it may be used in a magazine-type nailing machine.

BRIEF DESCRIPTION OF THE SEVERAL VIEWS OF THE DRAWINGS

FIG. 1 is a perspective view of the preferred form of clamp nail according to the invention.

FIG. 2 is a perspective view of the basic clamp nail.

FIG. 3 is a perspective view similar to FIG. 1 showing a practical commercial clamp nail produced from a rectangular blank.

FIG. 4 is a greatly enlarged fragmentary plan view of a corner of the leading edge of any of FIGS. 1, 2 or 3.

FIG. 5 is a cross sectional view of a clamp nail according to the invention taken on the line 5—5 of FIG. 6.

FIG. 6 is a plan view of a commercial type clamp nail.

FIG. 7 is a side elevation thereof

FIG. 8 shows a clamp nail of FIG. 1 in position in a joint.

FIG. 9 is a plan view of a fragment of a stick of clamp nails according to the invention; and FIG. 10 is an elevational view of FIG. 9.

DETAILED DESCRIPTION

The generic concept of the present invention in its simplest form is shown in FIG. 2. The clamp nail of FIG. 2 has a web 10 which has the upstanding parallel flanges 11, these flanges 11 being parallel over a major portion of the length of the clamp nail. At the leading end the web 10 flares outwardly and widens as indicated at 12 and the upstanding flanges 13 converge toward the flanges 11 and merge into them. The portion 12, 13 of the clamp nail of FIG. 2 is referred to as a transition section and in the embodiment of FIG. 2 the transition section commences at the leading end of the clamp nail in the direction of driving. During driving, the flanges of the transition section serve to draw the members to be joined tightly together. When fully driven, the parallel flanges maintain a uniform clamping action across the joint.

In FIG. 1 an additional feature is shown. In the Figures the same parts will be designated by the same reference numerals. Thus, in FIG. 1 the major rectangular portion of the web is indicated at 10 and the parallel upstanding flanges extending over a major portion of the length of the clamp nail are indicated at 11. The converging flanges and web portion constituting the transition section are again indicated at 12 and 13. In the embodiment of FIG. 1, however, there is a relatively short section again having parallel upstanding flanges 14 extending from a web porton 15 which has parallel sides but is wider than the portion 10.

Referring again to the description of the leading end of the clamp nail in FIG. 2, it may be pointed out that this configuration works well in soft woods. However, in hard woods there is a tendency for the flanges 13 and 11 to deflect outwardly or to be partially folded outwardly and downwardly which greatly reduces the clamping efficiency of the fastener. Therefore in hard woods it is desirable to follow the configuration of FIGS. 1 and 3. The short straight section with the parallel flanges 14 substantially reduces the tendency of the two sides to deflect outwardly. In other words, the portions 14 support the transistion section 13 as the clamp nail is driven into the material.

It should be noted that in the embodiment of FIG. 1 the flanges 11, 13 and 14 are all of the same height. Referring now to FIG. 3, there is shown a commercially practicable embodiment wherein the clamp nail is made from a rectangular blank. When a rectangular blank is used, the flanges 13a (corresponding to the flanges 13) and the flanges 14a (corresponding to the flanges 14) become lower in height because of the widened web portions 12 and 15. In the embodiment of FIG. 3 there is also illustrated a stacking ledge 11a which will be described in more detail in connection with FIGS. 5, 9 and 10.

It will be noted that the leading edges in the direction of driving in all embodiments are sharpened somewhat. This is illustrated in the fragmentary enlarged elevational view of FIG. 4. As shown in this Figure, the leading edge is tapered down to a width 14b which is between about 10% and about 20% of the thickness of the material of the clamp nail. The included angle A of the point is preferably about 60%.

In all of the Figures thus far described, there are shown the holes 16. The total area of the holes 16 should be at least 30% of the area of the web 10 and 12 or 10 and 15 of the clamp nail and there should be at least two holes 16 so as to leave between them a central column 17 extending axially of the clamp nail to provide additional strength during driving. FIG. 3 also illustrates a slight bow in the web 10, 15 and this is better illustrated in FIG. 5. The object of the bow is to bring the column 17 more nearly to the center of the flange height and thereby to bring the column and a greater portion of the web 10 under the driver in a nailing machine.

With respect to FIG. 4, it should be pointed out that the point there shown is a compromise point. A very sharp point works better in soft woods while a fastener with no point works very well in hard dense materials. The point described above and shown in FIG. 4 works satisfactorily in both hard and soft woods.

Referring particularly to FIG. 5, it will be noted that there is a small indentation or stacking ledge indicated at 11a along both of the flanges 11. The ledges 11a are formed in a coining operation during formation of the clamp nail itself, and therefore the distance X from the bottom of the ledge 11a to the back of the clamp nail will always be constant. It is extremely difficult in practice to form the clamp nail so that the top edges of the straight parallel flanges 11 are equidistant from the back of the fastener. If these edges are not strictly equidistant from the back of the fastener, it is obvious that one side of the resulting strip of fasteners when stacked together will be longer than the other and the strip will curve rather than be straight. Under these conditions it cannot very well be used in a straight magazine of a nailing machine.

However, since the ledges 11a are produced in a coining operation at the same time that the fastener is formed, the distance X shown in FIG. 5 will always be the same and when a plurality of clamp nails are stacked together as shown in FIGS. 9 and 10, they will be straight and can easily be used in a magazine of a nailing machine. When a plurality of clamp nails are assembled as shown in FIGS. 9 and 10, they may be held in assembled relations by means of a band of a suitable tape along the leading and trailing ends of the fasteners. Such tapes are indicated at 18 and 19. One or both of the tapes may of course be imprinted with indicia such as an arrow 20 (FIG. 9) to indicate a proper direction of insertion into a magazine.

While it will not show in the drawings, the clamp nail is preferably punched from the sheet metal such that the grain of the rolled sheet material from which it is manufactured runs perpendicular to the direction in which the fastener is to be driven. This particular grain orientation makes it possible to form the fastener with smaller bend radii in the corners without cracking the material at the bends. The ultimate tensile strength of the material and correspondingly the fastener is on the order of 10% higher than if the material grain were parallel with the direction in which the fastener is to be driven.

In FIG. 8 there is shown a joint between two pieces of wood indicated at 21 and 22 and this Figure simply shows the position of the clamp nail when driven into the joint. In actual practice, a clamp nail of the present invention having a length greater than 50% of the thickness of the wood being joined will produce a very tight joint and the joint will be tight when viewed from both sides.

It will be understood that minor modifications may be made without departing from the spirit of the invention. No limitation which is not specifically set forth in the claims is intended and no such limitation should be implied.

The embodiments of the invention in which an exclusive property or privilege is claimed are as follows:

1. A clamp nail comprising a channel having a web and marginal flanges extending in the same direction from said web, said web being of constant width over the major portion of its length, and having a relatively short tapered portion which is wider at its leading end in the direction of driving, said flanges extending along the entire length of the nail, including said major portion and said tapered portion, said tapered portion converging from said wider end to said major portion, said tapered portion and converging flanges constituting a transition portion; at least two transversely spaced holes of substantially equal size in said web being symmetrically arranged on opposite sides of the longitudinal axis of the nail, said holes leaving a relatively wide, longitudinally extending column of web material on said axis, said column being of sufficient width to impart strength to the nail in the direction of driving, the total area of said holes being at least 30% of the area of said web.

2. A clamp nail according to claim 1, wherein said transition portion commences at the leading end in the direction of driving.

3. A clamp nail according to claim 1, wherein said web has a relatively short and wider constant width portion at the leading end in the direction of driving, said relatively short constant width portion having parallel upstanding flanges, said transition portion connecting said relatively short constant width portion with said major portion.

4. A clamp nail according to claim 1, wherein said web is provided with a single bow extending inwardly in the direction of said flanges substantially from one flange to the other, to bring said column more nearly to the center of the flange height.

5. A clamp nail according to claim 1, wherein the top edges of said flanges have stacking ledges, the bottoms of which are at a fixed distance from the back of said nail, whereby a number of like nails may be assembled into a stick which will be straight.

6. A stick of clamp nails for use in a nailing machine having a magazine to accept such a stick, said stick being composed of a plurality of clamp nails according to claim 5 stacked with the back of one nail engaging the stacking ledges of an adjacent nail, and means holding the said stick in assembled relation and having indicia denoting the correct direction of insertion into said magazine.

* * * * *